UNITED STATES PATENT OFFICE.

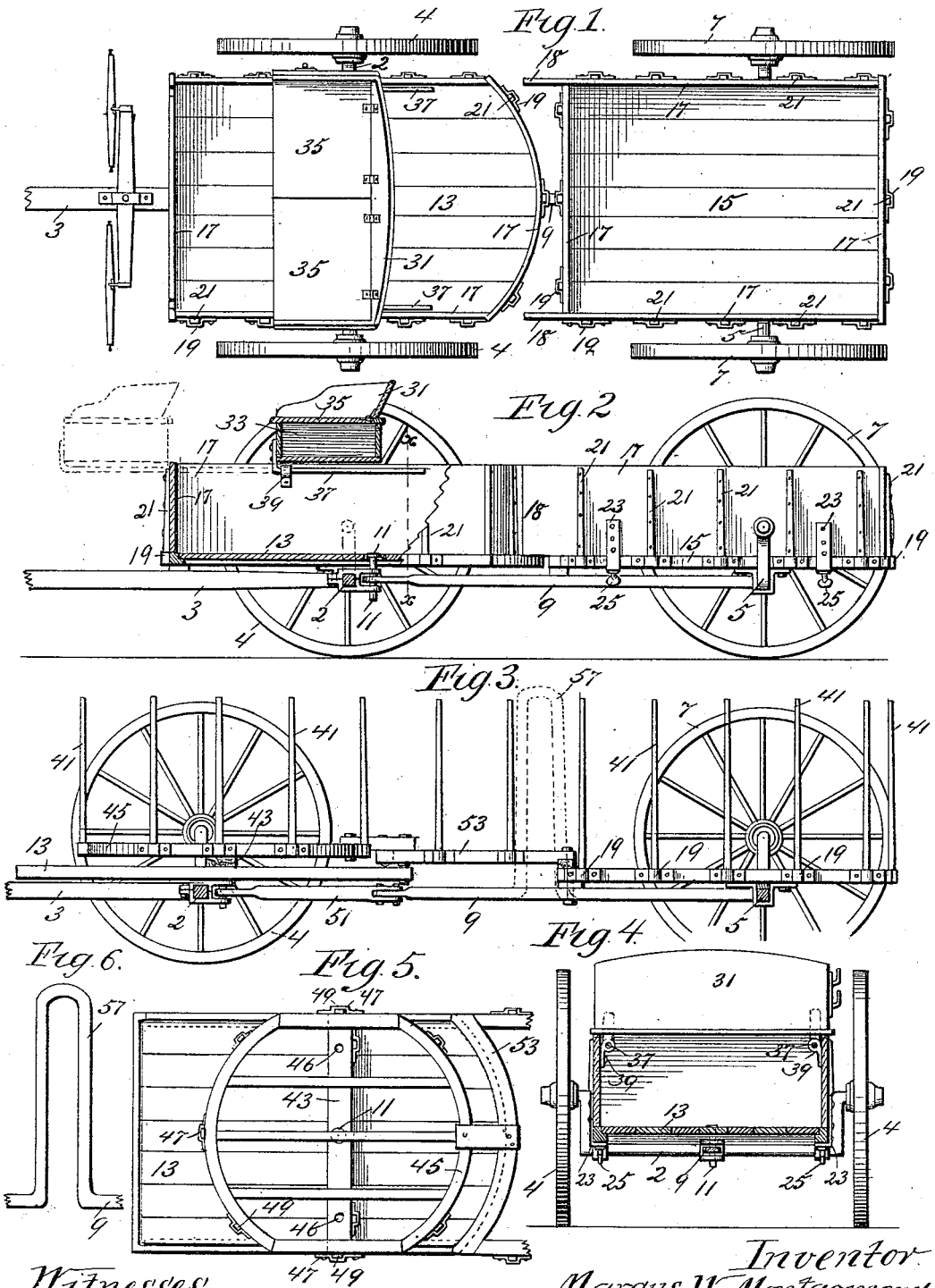

MARCUS W. MONTGOMERY, OF MINNEAPOLIS, MINNESOTA, ASSIGNOR TO PLYMOUTH G. MONTGOMERY, OF SAME PLACE.

FARM-WAGON.

SPECIFICATION forming part of Letters Patent No. 451,897, dated May 5, 1891.

Application filed May 3, 1890. Serial No. 350,440. (No model.)

*To all whom it may concern:*

Be it known that I, MARCUS W. MONTGOMERY, of Minneapolis, in the county of Hennepin and State of Minnesota, have invented certain Improvements in Farm-Wagons, of which the following is a specification.

The object of this invention is to provide an improved farm-wagon in which the wagon-bed will be supported in a position much lower than in the ordinary farm-wagon, while the wheels are as large or larger than on the ordinary wagon, thereby permitting the wagon-body to be made deeper, so that it will hold considerably more and the wagon itself be of lighter draft.

Another object is to provide a wagon of this character which may be made considerably wider than the ordinary wagon-bed, while the axles may remain the same length.

Another object is to provide a wagon in which the wagon-bed may be easily put on or off and in which the body side-boards will be secured in such a manner as to prevent rattling and wearing out.

Another object is to provide a wagon that can be turned in a small space and in which the usual bolsters and hounds may be dispensed with.

Another object is to provide a wagon in which the rear part of the body and the hind wheels may be readily detached, leaving the forward part of the wagon in shape to be used as a road-cart or a dumping-cart for hauling fertilizers, sand, stone, or other material; and another object is to provide a wagon having front and rear wheels of equal size and interchangeable.

Other objects of the invention will appear from the following detailed description, taken in connection with the accompanying drawings, in which—

Figure 1 represents a plan view of my improved wagon. Fig. 2 is a side elevation of the same with the forward portion broken away and in section. Fig. 3 is a side elevation with the axles in sections and the wheels upon one side removed, and showing the wagon in condition for using in hauling hay. Fig. 4 is a vertical section on line $x\ x$ of Fig. 2, looking toward the forward end. Fig. 5 is a plan view of the forward bed, showing a hay-rack arranged thereon. Fig. 6 is a detail of a modified form of reach.

In the drawings, 2 represents the forward axle, and 3 the pole secured thereto. The axle is preferably bent downward, as shown most clearly in Fig. 4, and is provided with the wheels 4.

5 represents the rear axle, which is similar to the forward axle and is provided with the wheels 7, which are preferably of the same size as the forward wheel. The rear axle is connected to the forward axle preferably by the reach or connecting-rod 9, being secured to the forward axle by the king-bolt 11, which is preferably arranged to be passed through an opening in the bottom of the bed, as shown in Fig. 2.

The wagon-bed is made in two sections, the section 13 being supported upon the forward axle and the section 15 supported upon the rear axle. These sections are preferably permanently secured to the axles, and each section is preferably provided with the removable side and end boards 17. The beds are each provided, preferably, with suitable sockets 19, and the removable boards 17 are provided with the posts or uprights 21, that are adapted to fit into the sockets 19, thereby holding the side and end boards in place. For the purpose of preventing these side and end boards from rattling, wearing, or getting out of place, I prefer to provide the clips 23, that engage the under surface of the bed-sill, and are provided with set-screws 25, which may be adjusted to hold the side-boards tight upon the bed. The forward bed 13 is preferably provided with a curved rear end, and the side-boards of one or both beds are preferably provided with the projections 18, that partially cover the space between the two beds. The forward end of the rear bed is preferably arranged to rest upon and is secured to the reach 9, while the forward bed is free therefrom. Arranged upon the forward bed is a seat 31, having its lower portion formed into a box 33 with hinged covers 35, which form the top of the seat. This forms a permanent driver's seat and a box for carrying tools and small articles which would otherwise be apt to be lost. The box and seat are arranged to slide on the side-boards of the forward bed, and are preferably provided with the guide-rods 37, secured to the forward portion of the box and extending through guides 39 upon the side-boards. By this means when it is desired to load the wagon the seat may be run forward beyond the forward end of the bed, as shown by dotted lines in Fig. 2. When it is desired to use the forward part of the wagon alone, the bolt 11 is withdrawn, and the rear portion of the wagon is thereby disconnected from the forward portion, and the forward part of the wagon may then be used as a road-cart for light driving.

It will be seen that the wagon-body thus constructed may be considerably wider than the ordinary wagon-body, and that it may be considerably deeper than the ordinary body, and that it will at the same time be considerably lower. A wagon-body thus constructed will hold at least fifty per cent. more than the ordinary wagon-body.

The rear portion of the wagon is readily detached from the forward portion, and all of the side and end boards may be quickly removed.

The wagon may be turned around in a very small space, and it is so constructed as to dispense with the usual bolsters and hounds.

The wagon is also provided with a permanent seat and tool-box for the driver, and the seat is in such position as to turn with the front axle, so that the driver always faces toward the team.

The driver's seat and box are readily removed from the position over the top of the wagon-body when it is desired to load or unload the wagon. The lines may be wrapped around and made fast to any convenient device upon the driver's seat, and as the seat turns with the pole the lines will not be slackened or tightened if the horses turn either to the right or to the left.

The front and hind wheels are preferably of the same size and interchangeable, thus cheapening the construction, as the manufacturers will have to carry only one size of wheel.

When the wagon is to be used for hauling lumber or other long material, the side-boards may be removed, and the bolster 43 may be placed upon the forward bed pivoted centrally to the bed. The bolster is preferably provided with the holes 46, that are arranged between its ends and its center, into which suitable stakes may be placed. Similar stakes may also be placed in the end sockets of the rear bed, and lumber may then be piled upon the wagon, resting upon the rear bed and upon the bolster on the forward bed between these stakes, and the forward wheels and the forward bed will then be free to turn under the bolster, and as the lumber does not extend the full width of the bed the wheels are permitted to turn a sufficient distance between the two beds.

When it is desired to use the wagon for hauling hay, the side-boards 17 are removed and hay-stakes 41 are put into the sockets 19 of the rear bed. Upon the bolster 43 is secured a short rack 45, provided with sockets 47 and stakes 49. If it be desired to make the wagon longer for the purpose of hauling hay, a short splice 51 may be connected to the end of the reach and to the forward axle. An intermediate rack-section 53, provided with hay-stakes, is secured to the forward end of the rear bed. This makes a continuous hay-rack, upon which hay may be loaded, while the forward axle and the forward bed remain capable of turning together in the same manner that they do when both of the wagon-bodies are in place. The hay is loaded upon the forward bed and separately upon the rear bed and the intermediate section until the hay gets above the tops of the stakes, thus leaving an open space between the hay loaded upon the forward bed and that upon the extension, which permits the forward wheels to turn in either direction. After the hay reaches the tops of the stakes it is then loaded across the entire length of the wagon in the usual manner.

For some purpose I may prefer to construct the wagon to turn in a still smaller space—as, for example, for use as a truck. To this end I construct the reach with an upwardly-extending loop 57, as shown in detail in Fig. 6, which permits the wheels to turn in the loops through the reach and enables the wagon to be turned in a very narrow space.

It will be seen that a wagon constructed in this manner possesses a great many advantages over the ordinary farm-wagon, and is capable of a variety of uses for which the ordinary wagon is not adapted.

I claim as my invention—

1. The combination, with the front and rear downwardly-bent axles and the wheels, of the independent wagon beds or bodies secured upon said axles, and the reach 29, secured to the rear axle, passing under both of said bodies, and pivotally connected to the forward axle, substantially as described.

2. The combination, with the front and rear axles and the wheels, of the independent wagon-bodies secured upon said axles, the reach secured to the rear axle, passing under both of said bodies, and pivotally connected to the forward axle and provided with a loop extending upwardly between said wagon-bodies, substantially as described.

3. The combination, in a wagon, with the front and rear axles and the wheels, of the independent wagon-bodies secured upon said axles and the reach passing under the forward body and pivotally connected to the forward axles, substantially as described.

4. The combination, with the front and rear axles and the wheels, of the independent wagon-bodies secured upon said axles, the reach passing under the forward body and pivotally connected to the forward axles, and the bolster pivotally supported upon the top of the forward body, substantially as described.

In testimony whereof I have hereunto set my hand this 28th day of April, 1890.

MARCUS W. MONTGOMERY.

In presence of—
  A. M. GASKILL,
  BESSIE BOOTH.